3,218,371
BLENDS OF (1) EPSILON CAPROLACTAM, (2) RUBBERY BUTADIENE-ACRYLONITRILE COPOLYMERS, AND (3) RESINOUS STYRENE-ACRYLONITRILE COPOLYMERS
Thomas S. Grabowski, Vienna, W. Va., assignor to Borg-Warner Corporation, Chicago, Ill., a corporation of Illinois
No Drawing. Filed July 31, 1961, Ser. No. 127,807
3 Claims. (Cl. 260—857)

The present invention relates to synthetic resins having new and unique properties and more particularly to a synthetic resin blend having good, high temperature properties.

More specifically, the present invention relates to blends of (a) polymerized epsilon caprolactam, (b) a rubbery copolymer of butadiene and acrylonitrile, and (c) a resinous copolymer of styrene and acrylonitrile.

Rubber-resin blends comprising rubbery butadiene-acrylonitrile copolymer and resinous styrene-acrylonitrile copolymer have desirable properties for use in many structures, such as radio cabinets, football helmets, luggage, pipe, and the like. However, their usefulness in many applications is somewhat limited due to the fact that they cannot withstand temperatures above about 200° to 225° F.

I have discovered that the addition of from 20 to 50 parts by weight of polymerized epsilon caprolactam to 80 to 50 parts by weight of a blend of rubbery butadiene-acrylonitrile copolymer and resinous styrene-acrylonitrile copolymer greatly improves the heat resistance of the rubber-resin blend.

The rubber portion of the rubber-resin blend may be any butadiene-acrylonitrile rubbery copolymer having an acrylonitrile content of from 15% to 44% and, correspondingly, a butadiene content of from 85% to 56%.

The resinous portion of the blend may be any resinous styrene-acrylonitrile copolymer having a styrene content of from 60% to 85% and, correspondingly, from 40% to 15% of acrylonitrile. The styrene may be replaced entirely, or in part, by alpha-methyl styrene, vinyl toluene or alpha-methyl vinyl toluene.

Blends were prepared by feeding (a) a rubbery copolymer containing 56% butadiene and 44% acrylonitrile, (b) a resinous copolymer containing 70% styrene and 30% acrylonitrile and (c) polymerized epsilon caprolactam (Zytel 211) into an extruder. The blends were extruded at a temperature of 400° F. (the extrusion temperature must be above the melting point of the caprolactam polymer), sheeted, and pelletized. The pellets were injection molded at 450° F. into bars ⅛ inch thick and lengths as indicated in the table below.

The bars were placed on a piece of aluminum foil and transferred to an electrically heated, air circulating oven maintained at a temperature of 270° F. The bars were removed from the oven after one hour and measured for shrinkage due to heat distortion. The following table discloses the composition in parts by weight of the various bars made, the length of the bar before the heat treatment, and the length of the bar after being subjected to a temperature 270° F. for one hour.

TABLE

| | A | B | C | D |
|---|---|---|---|---|
| Butadiene-acrylonitrile copolymer (56–44) | 60 | 20 | 20 | 20 |
| Styrene-acrylonitrile copolymer (70–30) | 40 | 60 | 50 | 30 |
| Epsilon caprolactam | | 20 | 30 | 50 |
| Length of bar before heating, inches | 5.850 | 5.864 | 5.875 | 5.859 |
| Length of bar after heating to 270° F. for 1 hour, inches | 4.668 | 5.792 | 5.804 | 5.807 |
| Percent shrinkage due to heating | 20 | 0.012 | 0.012 | 0.01 |

As evidenced by the results shown in the above table, the presence of from 20 to 50 parts by weight of polymerized epsilon caprolactam in the rubber-resin blend provides a plastic material which can withstand temperatures of 270° F. The blends of the present invention can therefore be used in structural shapes subjected to relatively high temperatures where the prior art rubber-resin blends could not be used, especially for television cabinets.

While this invention has been described in connection with certain specific details and examples thereof, these details and examples are illustrative only and are not to be considered limitations on the spirit or scope of the invention except insofar as these may be incorporated in the claims.

I claim:
1. A composition comprising a blend of (a) from about 50 to 20 parts by weight of polymerized epsilon caprolactam and (b) correspondingly from about 50 to 80 parts by weight of a mixture of (1) a rubbery butadiene-acrylonitrile copolymer and (2) a resinous styrene-acrylonitrile copolymer, said blend characterized in that it is prepared by blending at a temperature exceeding the melting point of said caprolactam.

2. A composition comprising a blend of (a) from about 50 to 20 parts by weight of polymerized epsilon caprolactam and (b) correspondingly from about 50 to 80 parts by weight of a mixture of (1) a rubbery butadiene-acrylonitrile copolymer containing 85% to 56% butadiene and correspondingly from 15% to 44% acrylonitrile and (2) a resinous styrene-acrylonitrile copolymer containing 60% to 85% styrene and correspondingly from 40% to 15% of acrylonitrile, said blend characterized in that it is prepared by blending at a temperature exceeding the melting point of said caprolactam.

3. A composition comprising a blend of (a) from about 50 to 20 parts by weight of polymerized epsilon caprolactam and (b) correspondingly from about 50 to 80 parts by weight of a mixture of (1) a rubbery butadiene-acrylonitrile copolymer containing 56% butadiene and 44% acrylonitrile and (2) a resinous styrene-acrylonitrile copolymer containing 70% styrene and 30% acrylonitrile, said blend characterized in that it is prepared by blending at a temperature exceeding the melting point of said caprolactam.

References Cited by the Examiner
UNITED STATES PATENTS
2,573,273   10/1951   Porth _____ 260—857

MURRAY TILLMAN, Primary Examiner.
WILLIAM H. SHORT, Examiner.